United States Patent
Wang et al.

(10) Patent No.: US 9,650,155 B2
(45) Date of Patent: May 16, 2017

(54) AIRCRAFT CONTROL APPARATUS, CONTROL SYSTEM AND CONTROL METHOD

(71) Applicant: SZ DJI TECHNOLOGY CO., LTD., Shenzhen (CN)

(72) Inventors: Tao Wang, Shenzhen (CN); Tao Zhao, Shenzhen (CN)

(73) Assignee: SZ DJI TECHNOLOGY Co., Ltd, Shenzhen (CN)

( * ) Notice: Subject to any disclaimer, the term of this patent is extended or adjusted under 35 U.S.C. 154(b) by 721 days.

(21) Appl. No.: 14/020,939

(22) Filed: Sep. 9, 2013

(65) Prior Publication Data
US 2014/0374541 A1    Dec. 25, 2014

Related U.S. Application Data

(63) Continuation of application No. PCT/CN2013/080210, filed on Jul. 26, 2013.

(30) Foreign Application Priority Data

Jun. 25, 2013    (CN) .......................... 2013 1 0255869

(51) Int. Cl.
*B64C 39/02* (2006.01)
*B64D 47/08* (2006.01)
(Continued)

(52) U.S. Cl.
CPC .............. *B64D 47/08* (2013.01); *B64C 13/20* (2013.01); *B64C 39/024* (2013.01); *A63H 30/04* (2013.01);
(Continued)

(58) Field of Classification Search
CPC ....... B64D 47/08; B64C 13/20; B64C 39/024; B64C 2201/127; B64C 2201/146;
(Continued)

(56) References Cited

U.S. PATENT DOCUMENTS 5,904,724 A * 5/1999 Margolin ............. G05D 1/0038
244/189
6,130,705 A * 10/2000 Lareau ..................... G01C 3/08
348/144
(Continued)

FOREIGN PATENT DOCUMENTS

CN          101948007 A      1/2011
JP          1993-285276      11/1993
(Continued)

OTHER PUBLICATIONS

Phantom Quick Start Manual, V1.6, (May 28, 2013 Rev.).

*Primary Examiner* — Justin Rephann
(74) *Attorney, Agent, or Firm* — Hogan Lovells US LLP

(57) ABSTRACT

An aircraft control apparatus, control system, and control method are disclosed. A control apparatus includes: a first control rod configured to have a movement in a first movement direction controlling a motion of an aircraft in a first motion direction, wherein after an external force on the first control rod in the first movement direction is removed, the first control rod automatically returns to a preset position in the first movement direction; wherein the preset position which the first control rod automatically returns to corresponds to the aircraft in the first motion direction maintaining a state of flight; wherein the maintaining state of flight depends on control signals received by the aircraft generated resulting from changes in the external force applied to the control rod in the first movement direction and state signals measured by state measurement sensors carried by the aircraft.

12 Claims, 9 Drawing Sheets

(51) Int. Cl.
  *B64C 13/20*  (2006.01)
  *A63H 30/04*  (2006.01)
  *G05D 1/00*  (2006.01)

(52) U.S. Cl.
  CPC .. *B64C 2201/127* (2013.01); *B64C 2201/146* (2013.01); *G05D 1/0033* (2013.01)

(58) Field of Classification Search
  CPC ........ B64C 27/57; A63H 30/04; A63H 27/12; G05D 1/0022; G05D 1/0038
  See application file for complete search history.

(56) References Cited

U.S. PATENT DOCUMENTS

| | | | | |
|---|---|---|---|---|
| 8,903,568 B1* | 12/2014 | Wang | ................. | B64C 19/00 244/189 |
| 2003/0066932 A1* | 4/2003 | Carroll | ................. | B64C 39/024 244/120 |
| 2006/0016966 A1* | 1/2006 | Hughes | ................. | G03B 15/006 250/221 |
| 2008/0231465 A1* | 9/2008 | Lee | ................. | G08C 17/00 340/13.25 |
| 2009/0204276 A1 | 8/2009 | Stuckman et al. | | |
| 2010/0161155 A1* | 6/2010 | Simeray | ................. | A63H 27/12 701/3 |
| 2011/0301784 A1* | 12/2011 | Oakley | ................. | B64C 27/04 701/2 |
| 2012/0173053 A1* | 7/2012 | Ohtomo | ................. | G05D 1/101 701/4 |
| 2014/0316616 A1* | 10/2014 | Kugelmass | ................. | G05D 1/101 701/8 |
| 2015/0151851 A1* | 6/2015 | Lin | ................. | B64D 47/08 348/144 |

FOREIGN PATENT DOCUMENTS

| | | |
|---|---|---|
| JP | H5-285276 | 11/1993 |
| JP | 2006-264573 | 10/2006 |
| JP | 2007-267485 | 10/2007 |
| JP | 2011-511736 | 4/2011 |
| JP | 2012-140101 | 7/2012 |

* cited by examiner

AIRCRAFT CONTROL APPARATUS, CONTROL SYSTEM AND CONTROL METHOD

CROSS-REFERENCE TO RELATED APPLICATIONS

The present application is a continuation of PCT/CN2013/080210 filed on Jul. 26, 2013, which claims priority to CN 201310255869.6 filed on Jun. 25, 2013. The disclosures of these applications are hereby incorporated by reference in their entirety.

BACKGROUND

In recent years, unmanned movable body, including aircrafts (such as fixed-wing aircrafts, rotary wing aircrafts including helicopters), motor vehicles, submarines or ships, and satellites, space stations, or spaceships find many areas of applications, such as in surveillance, search and rescue and other fields. The operation of these movable bodies usually can be achieved by users through remote control apparatuses. A remote control apparatus usually uses two sets of joysticks or control rods to control aircraft movement in four dimensions, namely forward and backward, left and right, up and down, and orientation, respectively. Usually, the joystick or control rod for controlling the three dimensions of forward and backward, left and right, and orientation can, through its internal self-homing structure, return to the middle position by itself. The joystick or control rod controlling up and down motions cannot return on its own to its middle position.

SUMMARY

The present disclosure relates to remote control apparatus, particularly involving aircraft control apparatus, control system, and control method.

In an aspect, the present disclosure provides an aircraft control apparatus, including: a first control rod configured to have a movement in a first movement direction controlling a motion of an aircraft in a first motion direction, wherein after an external force on the first control rod in the first movement direction is removed, the first control rod automatically returns to a preset position in the first movement direction; wherein the preset position which the first control rod automatically returns to corresponds to the aircraft in the first motion direction maintaining a state of flight; wherein the maintaining state of flight depends on control signals received by the aircraft generated resulting from changes in the external force applied to the control rod in the first movement direction and state signals measured by state measurement sensors carried by the aircraft.

In some embodiments, a process for the first control rod to return automatically to the preset position after the external force on the first control rod in the first movement direction is withdrawn corresponds to a process for the aircraft in the first motion direction to start decelerating until its velocity becomes zero.

In some embodiments, the preset position is a center position of the first control rod in the first movement direction.

In some embodiments, the control apparatus further includes a spring apparatus to drive the first control rod to automatically return to the center position after the external force is withdrawn.

In some embodiments, the first motion direction is an up and down direction of the aircraft, wherein the control apparatus further comprises a second control rod configured to control a translational flight, and wherein the second control rod also has a corresponding spring apparatus to make it return automatically to its center position.

In some embodiments, the first control rod in a second movement direction controls an orientation of the aircraft, and wherein the first control rod also returns to a center position in the second movement direction after an external force on the first control rod in the second movement direction is withdrawn.

In some embodiments, an extent of movement of the first control rod in the first movement direction is proportional to an up or down motion velocity of the aircraft.

In some embodiments, the aircraft is configured to realize imaging functions of a ground target using a camera carried thereon, wherein camera has a lens zooming out/in function, wherein the movement of the first control rod in the first movement direction controls the aircraft's up/down, the camera's focal length zooming out/in, or a coupled motion of the aircraft's up/down and the camera's focal length zooming out/in, wherein the maintained aircraft state comprises a coupled value of the aircraft's height and the camera's focal length.

In another aspect, an aircraft control method is provided, wherein the control method includes the following steps: receiving control signals resulting from a movement of a first control rod in a first movement direction, the control signals controlling a motion of the aircraft in a first motion direction; determining whether the control signals change to control signals corresponding to the first control rod's return to a preset position in the first movement direction resulting from a withdrawal of an external force over the first control rod in the first movement direction; if yes, then controlling the aircraft to maintain a flight state in the first motion direction.

In some embodiments, the method further includes the following steps: when the external force over the first control rod in the first movement direction is withdrawn, the aircraft enters a deceleration state in the first motion direction; if the first control rod stays at the preset position in the first movement direction, then the aircraft maintains its state after the aircraft's velocity in the first motion direction decelerates to zero.

In some embodiments, the method further includes the following step: receiving control signals resulting from the first control rod's movement in the first movement direction, the control signals are also configured to control the aircraft's up/down, a camera's focal length zooming out/in, or a coupling thereof.

In some embodiments, the control method further includes: determining whether external forces in all directions over the first and a second control rods are withdrawn resulting in the first and second control rods returning automatically to their respective preset positions; if yes, then controlling the aircraft to enter a hovering state.

In some embodiments, the control method further includes: measuring state signals of the aircraft, providing the measured aircraft state signals to feedback to the aircraft to thereby control the aircraft to be in the maintained state.

In another aspect, an aircraft control system is provided including: a remote control apparatus, including: a first control rod, its movement in a first movement direction corresponds to control signals for controlling the aircraft in a first motion direction; a return device configured to return the first control rod automatically to a preset position in the first movement direction in the case that an external force over the first control rod in the first movement direction is withdrawn; a controller configured to control a state of the aircraft based the control signals and aircraft state signals, wherein the controller is configured to control the aircraft to enter a state maintain in the case that the first control rod automatically returns to the preset position in the first movement direction.

In some embodiments, a process for the first control rod to automatically return to a preset position after an external force in the first movement direction is withdrawn corresponds to a deceleration process for the aircraft in the first motion direction.

In some embodiments, the control system further includes at least one state measurement sensor to measure the aircraft's state signals to provide to the controller.

In some embodiments, the control system further includes an aircraft operation surface configured to drive the aircraft to adjust its state, characterized in that: the at least one state measurement sensor, the controller, and the aircraft control surface form a closed feedback loop to control the aircraft to be in the state maintain.

In another aspect an aircraft control method is provided, wherein the control method includes the following steps: using an external force to control a first control rod to move in a first movement direction to thereby generate a hand control signal; the first control rod, in the case the external force in the first movement direction is withdrawn, returning to a preset position in the first movement direction; determining whether the hand control signal disappears; if yes, then controlling the aircraft to enter a flight state stably maintained in the first motion direction.

In some embodiments, said controlling the aircraft to enter a flight state stably maintained in the first motion direction is realized through a feedback to the aircraft controller with measured state of the aircraft to control the aircraft control surface, thereby forming a closed feedback loop.

In some embodiments, said controlling the aircraft to enter a flight state stably maintained in the first motion direction comprises controlling a coupled value of the aircraft's altitude and a focal length of a camera carried by the aircraft to maintain stably.

As compared with current technologies, the first control rod of the control apparatus of the aircraft in the present disclosure has a movement in the first movement direction controlling the motion in the first motion direction, and returns automatically to the preset position in the first movement direction after the external force in the first movement direction is removed, at this time the aircraft maintains its position without displacement in the first motion direction. Therefore, at least some of the disclosed embodiments may overcome the prejudice in the conventional technologies—the control rod controlling the up and down motions cannot automatically return to the preset position, and designs the control rod controlling the up and down motions to be able to automatically return to the preset position, therefore during the flight of the aircraft, when operating the control apparatus, other control rods' movements will not cause the first control rod controlling the up and down motions to move following other control rods' movements, thereby realizing maintaining the flight altitude of the aircraft.

DETAILED DESCRIPTION

Figure 1:
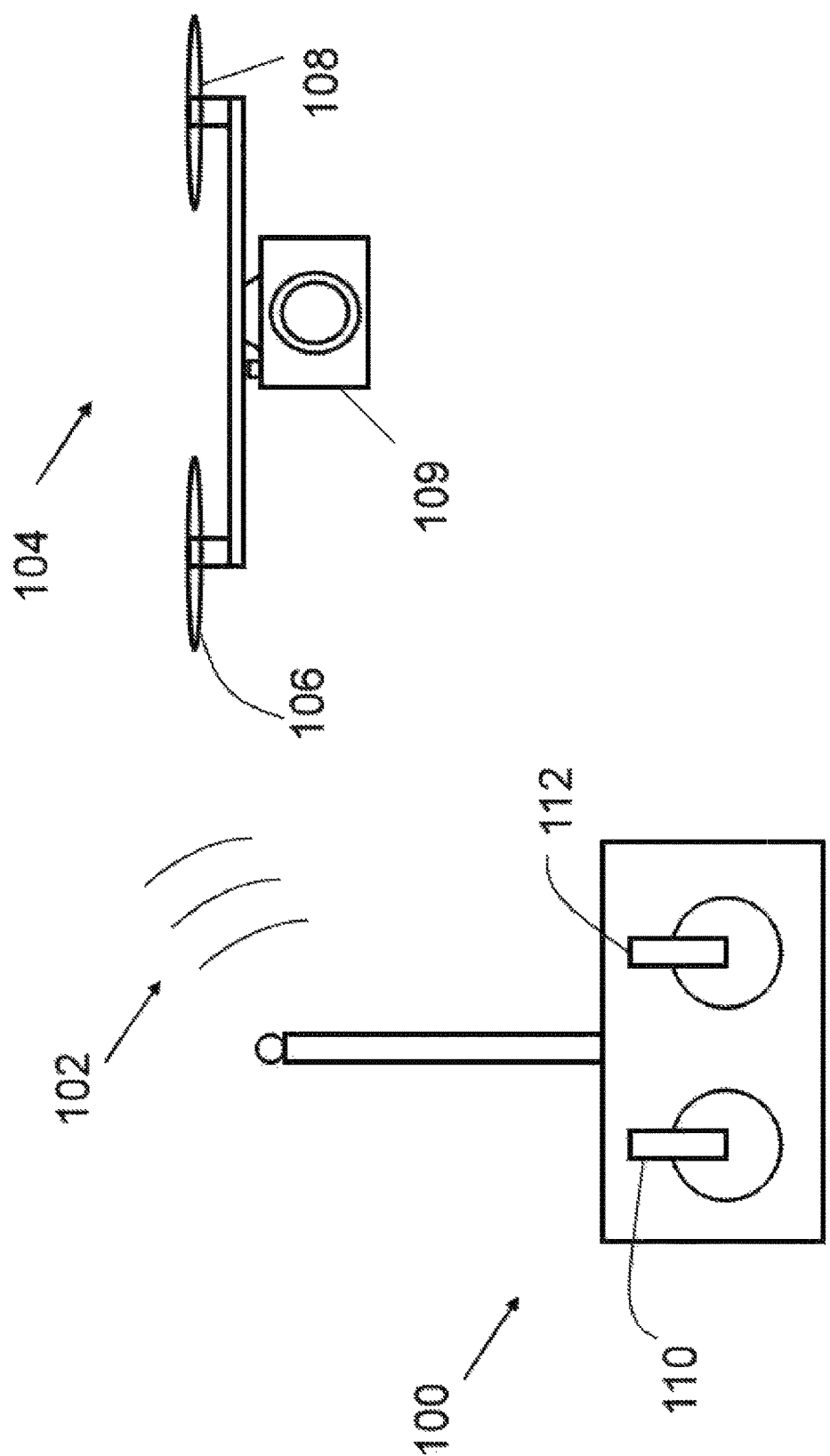
FIG. 1 is a schematic diagram of a set of aircraft and control apparatus.

Traditional control rod in the vertical direction cannot return itself to the center position as a result of the following reason. A traditional aircraft has few electronic control devices. For different types of aircrafts, or aircrafts of different weight, it is very difficult for the center position of the control rod is very difficult to control the aircraft position is the up and down direction to remain the same, i.e., there is no stable state in that direction the aircraft. As such, the control rod in the up and down direction usually does not stay in the center position, and it usually uses friction to allow the control rod to stay in any user-defined locations.

In addition, ire the absence of a lot of electronic equipment on the aircraft, the vertical control usually corresponds directly to the aircraft start command, which also led to the traditional vertical control rod not being designed to automatically return to its original position; otherwise the user's letting go will result in the aircraft being turned off.

Because the traditional remote control rod in the up and down direction utilizes friction to stay in a position, during flight, the movement of other control rods may also drive the motion of this control rod causing the rod movement crosstalk, resulting in difficulty in the control of the height of flying height. In addition, if the user wishes to keep the aircraft height unchanged, it would be more difficult to find the corresponding position of the control rod, thereby causing the operation more difficult.

The control apparatus (remote controller) of the present disclosure control can be used to control a motion of a movable body (such as an aircraft) in four dimensions (forward and backward, left and right, up and down, and orientation). The movable body may have a carrier (for example, a gimbals with stabilization function), which can carry a payload, in order to achieve the fixation of the payload, to arbitrarily adjust the attitude of the payload (for example: to change the altitude, inclination and/or orientation) and to keep the payload maintain stably a specified attitude. The carrier can be used as an assistive device for filming, photography, monitoring, sampling etc., can be applied to air-based (such as rotorcraft or fixed-wing aircraft), water-based (such as submarines or vessels), road-based (e.g., motor vehicles), or space-based (such as satellites, space stations, or spaceships) etc. The payload may include imaging devices such as cameras and video cameras, and also can be sensors. In some of the following embodiments, the camera is used as an example of a payload, and the carrier is applied to an aircraft, to explain the beneficial effects of some of the disclosed embodiments. Of course, it should be understood that the payload can also surveillance cameras, lights and so on. Below with the accompanying drawings, some embodiments of the present disclosure will be described in detail.

In some embodiments of the present disclosure, an aircraft is equipped with an automatic control device, simplifying the operation of the remote controller. The remote controller can act only as a motion operation instruction sender. In the following some embodiments, the respective center positions of the joysticks can be defined as that there is no motions in the corresponding dimensions. The remote controller can also define specific operations as the start command, thereby avoiding the drawbacks of relying on a single control command.

As the traditional habit, no one thought of changing the conventional remote controller, wherein the control rod in the up and down direction adopts a friction method to stay in a position. The inventors of the present disclosure overcome the traditional technical bias—that the control rod controlling the up and down motions cannot automatically return to the default position, and designed the control rod for the up and down motion as automatically returning to the default position, thereby achieving good the technical effects. During the flight, other control rods' movements will not drive the control rod for controlling the up and down motion, and it is easier to maintain the flying altitude.

Embodiments disclosed herein may also greatly simplifies the operation of the remote controller. If the user wishes to have the aircraft altitude remain unchanged, the user can easily find the control rod's center position (only need to release the hand for the user to realize the goal of maintaining the aircraft altitude, no need to rely on experience to hand-control it to return to the center position; manual control is not very accurate, and often fine-tuning is required). As such, the present disclosure provides a technical solution with different technical concepts, and the results are better than the current technical solutions.

Some embodiments of the present disclosure simplify the remote control operation methods, and very likely may become the development trend of remote controllers.

FIG. 1 is a schematic diagram of an aircraft and its remote control system. The control device 100, via signal 102, remotely controls of the aircraft 104. Signal 102 may be a wireless signal, such as radio, infrared, ultrasonic, etc., and may also be transmitted by wire. Aircraft 104 may be a vertical flight aircraft including a plurality of rotor wings 106,108, and can also be a helicopter or a fixed-wing aircraft. Aircraft 104, through a gimbals (not shown), can carry payload such as the camera 109, in order to achieve functions such as imaging etc.

The operation methods of the control apparatus 100 may include using a first control rod 110, a second rod 112, to control the aircraft's motions in multiple dimensions, such as forward and backward, left and right, up and down, and orientation. Although here the term "control rod" is used, the technical personnel in this field will understand that "control rod" does not necessarily have a geometrically rod shape. Non-rod-shaped control member, according to the preferences of the user operations, may also realize the aircraft control functions.

FIG. 1 shows the control rod as having a shape of a rowing rod (often referred to as "joystick"). However, technical persons skilled in the art will understand that the control member may function by translational movement, sensing a force without movement or rotation, or other methods of sensing the operation movement of the user, in order to achieve the function of controlling the aircraft.

In FIG. 1, second control rod 112 is used to control the flight of the aircraft in the two dimensions of forward/backward and left/right translational motions, and can return by itself to its center position through the internal structure of the control rod, corresponding to the control command of "0," i.e., the aircraft maintains its forward/backward and left/right position unchanged. The orientation can be controlled by the first control rod 110 with the left or right drive. The first control rod 110 in the left/right direction can also restore itself to the middle position, and the corresponding control command is to keep the orientation of the aircraft 104 remain unchanged.

The first control rod 110 moving in the up/down direction may correspond to the up/down motion of the aircraft 104, to achieve the climb/descent control of the aircraft 104. Traditional control rod controlling the up/down motion usually cannot normally restore itself to the center position.

In some embodiments, the two control rods 110, 112, respectively positioned at the lower left corner and the lower right corner, can be defined as a start command. That is, the two control rods 110, 112, when driven by a user from their original positions (e.g., center positions), do not affect the aircraft's activation status (if it is in the off state, then the aircraft maintains the off state); and if the user pushes the control rods 110,112, respectively, to the left, right bottom corners at the same time, the aircraft starts from its off state.

According to some embodiments of the present disclosure, a new aircraft remote control operation method comprises: allowing two sets of control rods 110, 112 in the four control dimensions to all have automatic return-to-a-specific-location (e.g., center position) function.

Some of these embodiments have the benefits including: allowing users to easily find each center position in each direction, and that during the flight it is easier to control the flying altitude to remain unchanged. An operator only needs to let go with both hands, and the aircraft can achieved stability in all directions, so that flying becomes easier. In the technical solution of one particular embodiment, the up and down remote control channel previously without the automatic return-to-center function is now changed to have the same structure as the other channels, so that it can automatically return to the center position.

Figure 2:
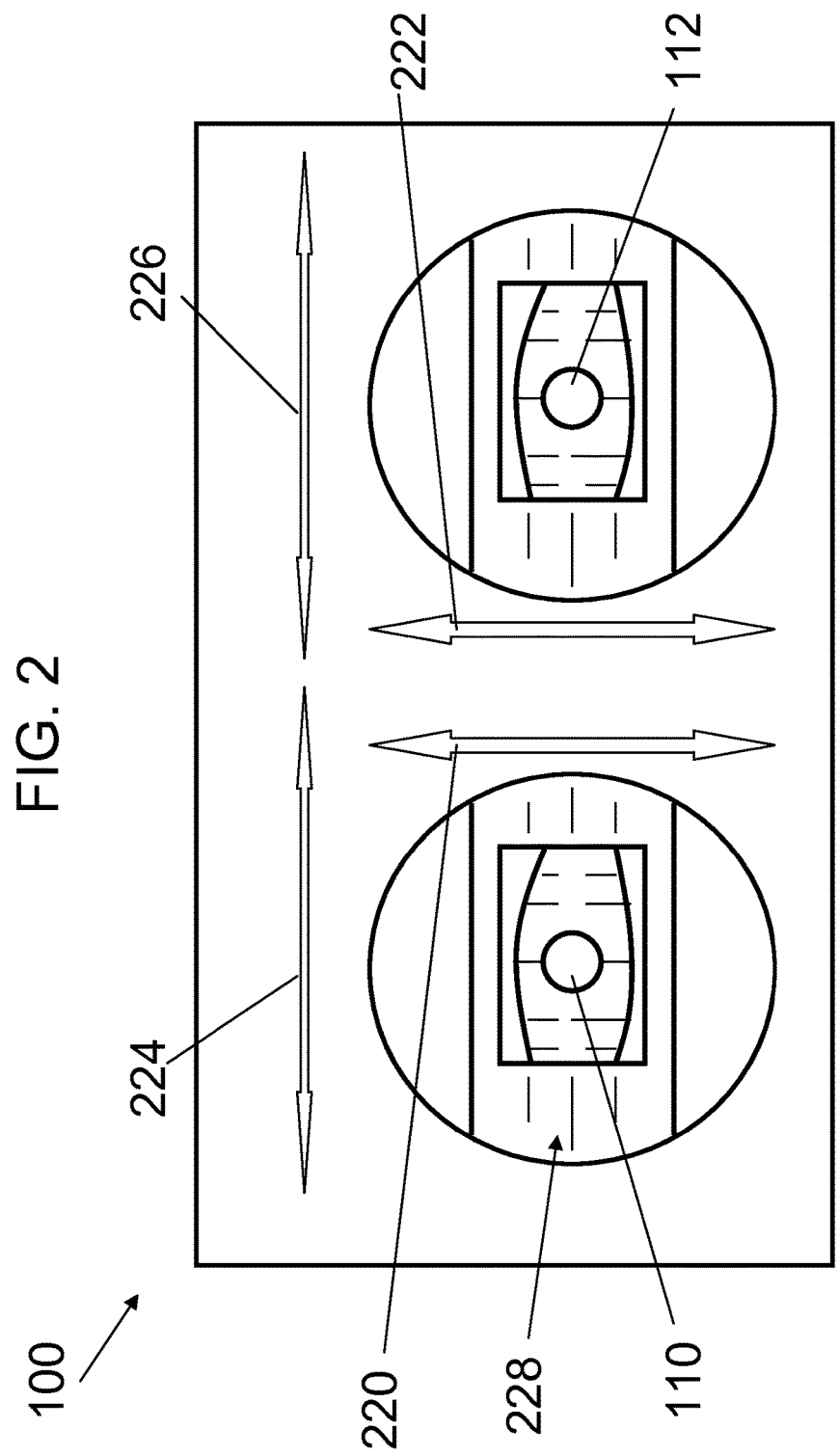
FIG. 2 is a top plan view of the control apparatus of FIG. 1.

FIG. 2 is a top plan view of the control apparatus 100. The first control rod 110 in a first direction of movement (for example, the up/down direction when the control apparatus 100 is positioned upright facing the user) can control the motion of aircraft 220 in the first motion direction (e.g., in the climbing/descending direction), such as vertical climb, descend, or altitude changes. The second control rod 112 moving in the up/down direction 222 may correspond to remotely-controlling the forward and backward translational flight of the aircraft. The first control rod 110 moving in a second direction (e.g., left-right direction) 224 can control the heading of the remotely-controlled aircraft. In some embodiments, the first control rod 110 moving in the second direction, after the removal of the external force 224, also automatically returns to the center position in the second direction 224. The second control rod 112 moving in the left-right direction 226 may correspond to the aircraft's translational flying toward the left or the right.

The control apparatus 100 also have scales 228 respectively corresponding to movements of the control rods 110, 112 in different directions 220, 222, 224, 226, etc., to prompt the user to control the range of movement of control rods.

It should be noted that, although the different directions 220, 222, 224, 226 in FIG. 2 are respectively described as "up/down," "left/right," those skilled in the art will appreciate that this description is only relative.

Figure 3:
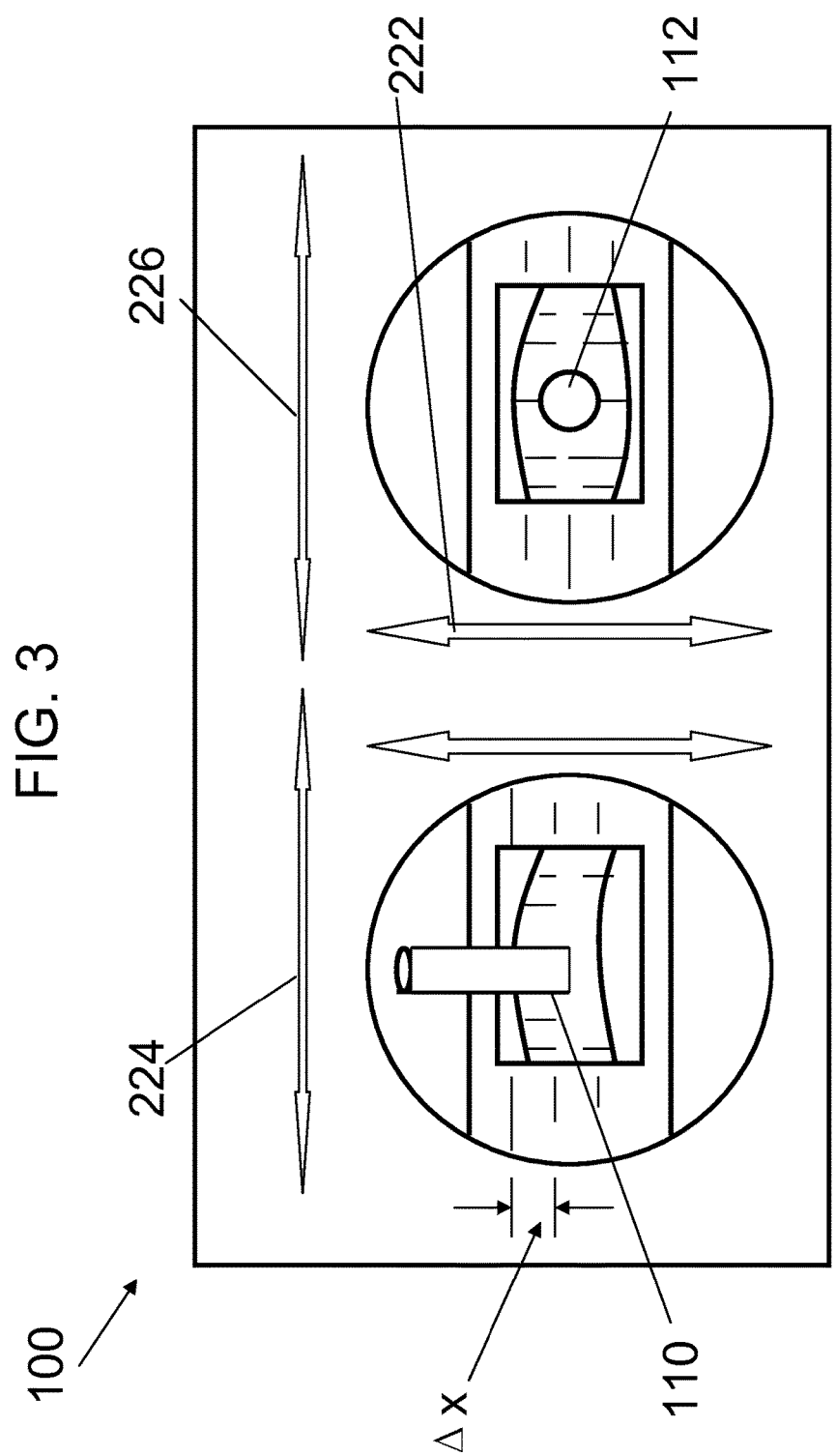
FIG. 3 is a diagram illustrating an operation of the control apparatus of FIG. 2 controlling the aircraft to move upward.

FIG. 3 is an operational diagram of the control apparatus 100 controlling the aircraft to climb. The first control rod 110, when pushed upward by the user, the flight controller receives the corresponding control signals, and the flight controller controls the aircraft 104 to climb. In some embodiments, the climbing velocity of the aircraft 104 is approximately proportional to an extent of movement of the control rod 110 in FIG. 2 being pushed upward relative to its preset position.

According to one of the preferred embodiments of the present disclosure, when the user removes the external force applied to the first control rod 110 in the first direction 220 of the movement (e.g., upward push), the control rod 110 can automatically return to the preset position in the first movement direction, for example, in FIG. 2, the originally preset position (e.g., center position).

The control rod 110 automatically returning to its preset position can be realized using a homing device (such as a spring device or a resilient organic material, etc.) implemented in the control apparatus 100. This way, the first control rod 110 and the second control rod 112 can have substantially the same mechanical structures. The first control rod 110 and the second control rod 112 control the aircraft 104 in different ways, for example as described below.

Provided in the aircraft 104 may be an automatic control device that can, in the case that the first control rod 110 in a first direction of movement 220 automatically returns to a predetermined position in the first direction of movement, control the aircraft 104 in the first motion direction to enter a flight mode maintaining.

Wherein the maintained flight mode can be dependent on signals received by the aircraft, including control signals generated from the changes in the external force received by first control rod 110 in its first direction of movement, and status signals measured by state measurement sensors carried by the aircraft. For example, to remain in the new altitude just achieved by the aircraft through climbing. This way, the user's operations are simplified, and the handling of the aircraft 104 becomes easier and more precise.

Figure 4:
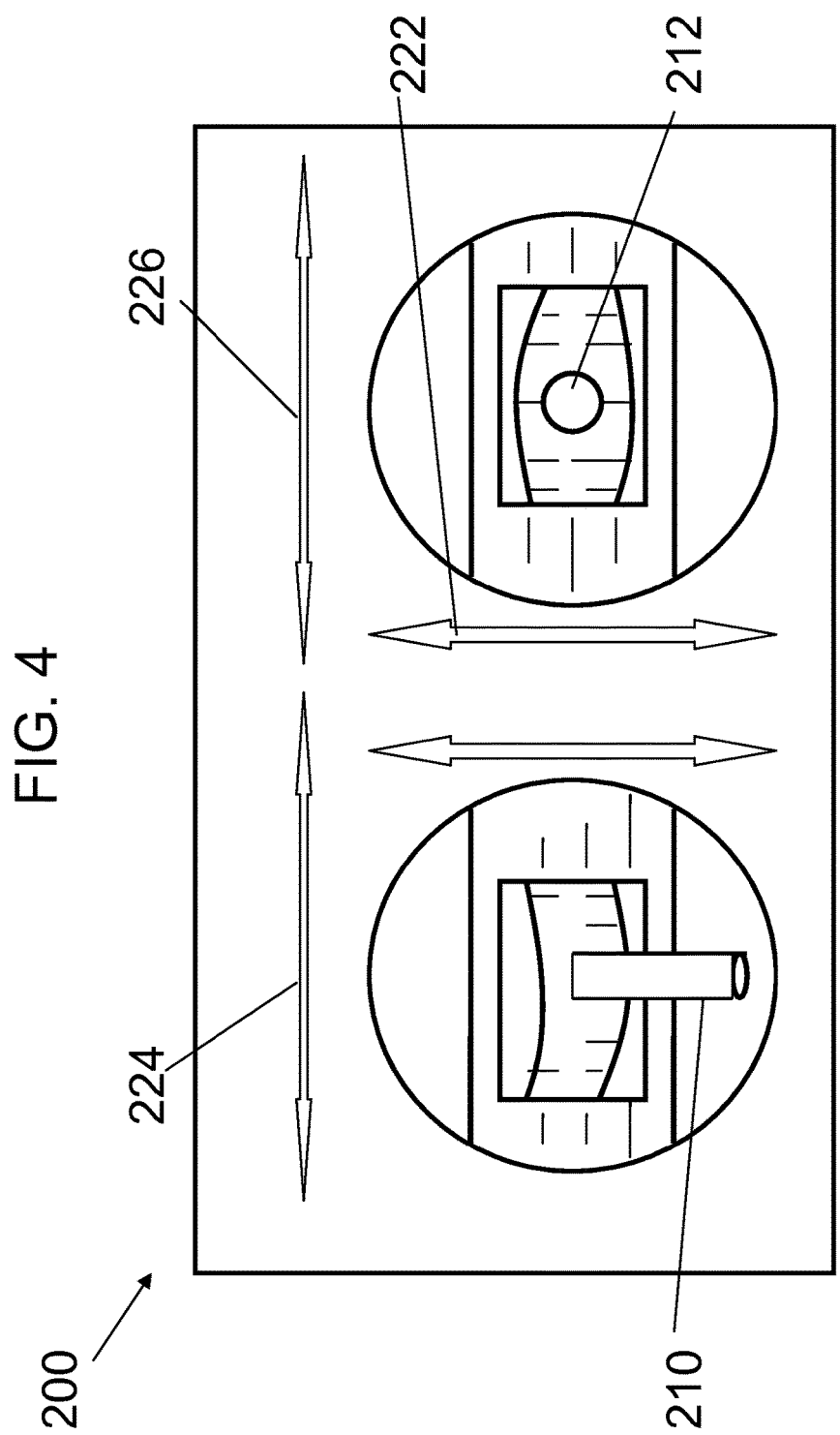
FIG. 4 is a diagram illustrating an operation of the control apparatus of FIG. 2 controlling the aircraft to move downward.

FIG. 4 is an operational diagram illustrating the control device 100 controlling the aircraft to descend. When the first control rod 110 is pushed downward by the user, the aircraft controller accepts the signal, making the aircraft 104 descend. In some embodiments, the rate of descent of the aircraft 104 is approximately proportional to the extent of movement of the first control rod 110 in FIG. 2 being pushed downward relative to its original position. As such, the extent of movement of the first control rod in the first direction of movement is proportional to the aircraft climb or descent speed.

According to one of the preferred embodiments of the present disclosure, after the user removes the downward pushing external force applied to the first control rod 110, the first control rod 110 can automatically return to the original preset position shown in FIG. 2, such as the center position. The control rod 110 returning to its original position automatically can be realized by the a spring disposed in the control apparatus 100, or in other ways.

Provided in the control apparatus 100 or in the aircraft 104 may be an automatic control device that can, in the case that the first control rod 110 in a first direction of movement 220 automatically returns to a predetermined position in the first direction of movement, control the aircraft 104 in the first motion direction to maintain the new altitude which the aircraft just descended to. This way, the user's operations are simplified, and the handling of the aircraft 104 becomes easier and more precise.

In summary, the automatic control device can control the aircraft to be in a maintained flight state. The flight state may include aircraft attitude, altitude, heading, speed, and so on. For example, the automatic control device can control the altitude of the aircraft, such as making the aircraft 104 to automatically maintain the current altitude of the aircraft. The system can also automatically correct errors generated during hovering and flying of the aircraft 104, and correct the interference caused by wind.

Automatically returning to the preset positions (for example, automatic return to center) of the control rods 110, 112, according to various embodiments, may have different control methods. For example, the automatic return to center of the first control rod 110 moving in a first movement direction 220 may be designed to control the aircraft to enter into an altitude hold state, at this time the altitude of the aircraft 104 can be locked; the automatic return to center of the second control rod 112 in both movement directions 222, 226 may be designed to control the aircraft to enter into a horizontal position holding state, at this time the horizontal position of the aircraft 104 can be locked, thereby simplifying users manipulation procedures. For example, users only need to control one rod extent of movement each time. In a specific example, the user does not apply force to the first control rod 110, and the aircraft 104 maintains its flying altitude of the previous time, and without spinning; while the push of the second control rod 112 in the forward/backward and left/right directions can respectively correspond to aircraft body inclination angles of the aircraft 104 in the forward/backward and left/right directions (corresponding to the translational velocities of the aircraft 104 in the forward/backward and left/right directions). If the user releases the second control rod 112, then the aircraft 104 maintains the horizontal position of the previous moment. If the user in a first direction of movement pushes the first control rod 110 upward, then the aircraft 104 climbs vertically. If the user pushes the first control rod 110 left or right in the second direction of movement, then the aircraft 104 rotates left or right.

For example, in the above examples, the rate of climb of the aircraft 104 may be approximately proportional to the extent of movement of the first control rod 110 being pushed upward relative to its original position (rod extent of movement) in FIG. 2. This extent of movement can be described with scale 228, which can be quantified as the rotation angle of the rod. For example, the value of rotation $\Delta x$ may be proportional to the aircraft climbing speed 104 vH, that is: $vH = k\Delta x$, where k is a constant factor. For example, the first control rod 110, being pushed to the largest extent of movement, may correspond to an aircraft climb speed of 6 m/sec. Except the acceleration and deceleration phases, the above proportionality relationship may be linear. For example, the first control rod 110, when pushed to its half way of the upper half stroke, the corresponding climbing speed of 3 m/s.

The extent of movement of the upward push can also be quantified by the rotation angle of the control rod 110, e.g., an upward rotation of 25° may allow the aircraft 104 to achieve a 6 m/s rate of climb, equivalent to for each 1° of rotation upward, the climb speed of the aircraft 104 increases by 0.24 m/sec.

Figure 5:
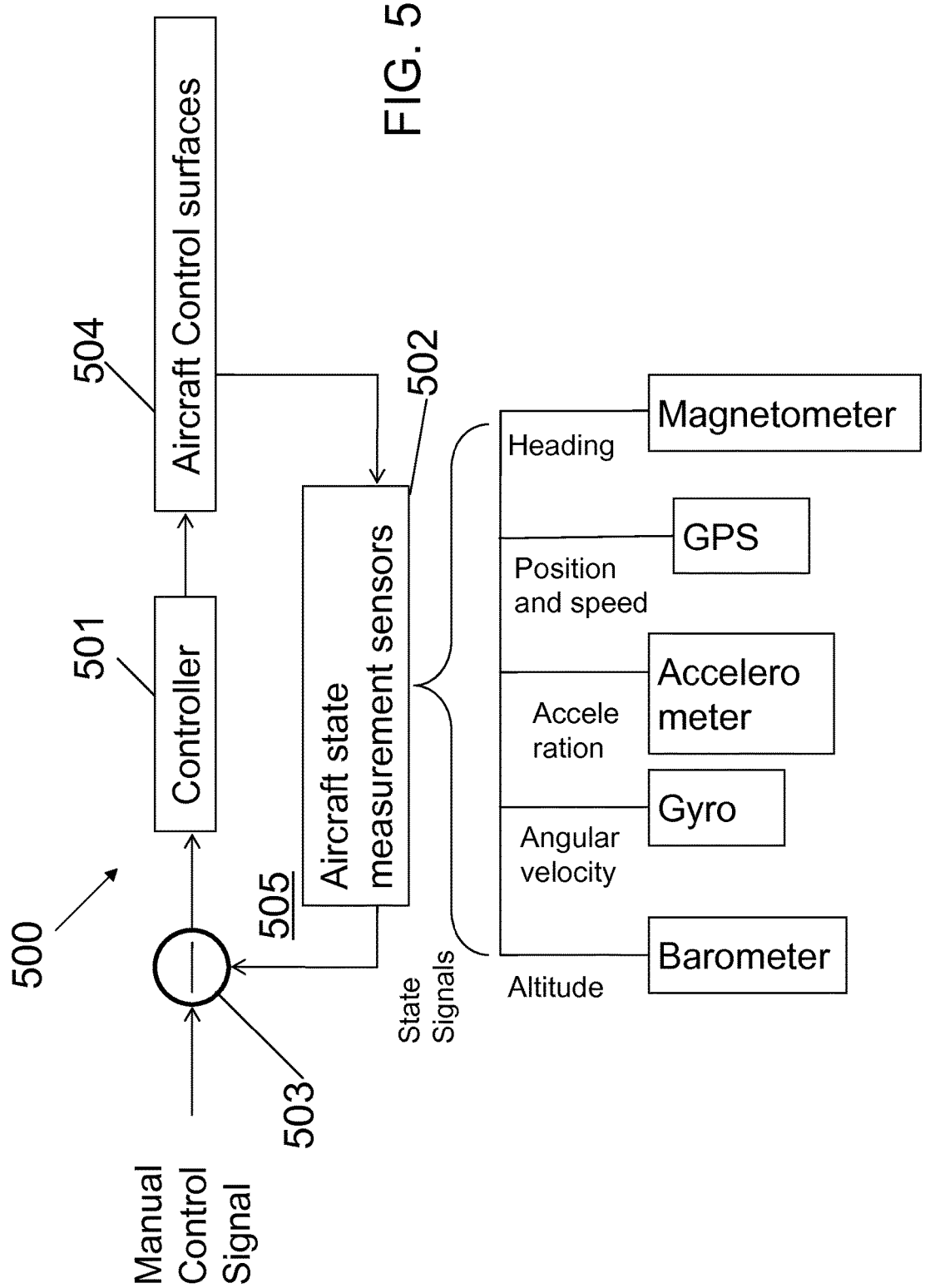
FIG. 5 is a block diagram illustrating the principles of an automatic control system realizing automatic control of the aircraft.

FIG. 5 is an aircraft control system block diagram 500. Automatic control system 500 includes a controller 501, an aircraft state measuring sensor 502. Aircraft state measuring sensor 502 may include at least one of a barometer, a gyroscope, an accelerometer, GPS, a magnetometer, etc., for measuring the altitude, velocity, acceleration, position and velocity, direction etc. signals of the aircraft, and integrating the aircraft state signal.

This state signal, together with a target signal from the outside, such as signal 102, may be processed in a signal processor 503. Signal processor 503 may include a comparator to compare the abovementioned hand control signal with the state signal, and/or a signal mixer to mix the above mentioned hand control signals with the state signals. The comparison and/or the mixed signals can be transmitted to the controller 501, and the controller 501 controls the aircraft control surfaces 504 to drive the aircraft for adjustment of state (such as adjusting the rotary wing tilt angle, adjust the engine power, adjust the power differences among multiple engines, etc), to thereby control the flying state. As such, the controller 501 becomes an interface between a signal and the control surfaces that influences the aerodynamics the aircraft. For helicopters, the control surfaces 504 of the aircraft can include rotor tilt angle adjustment, engine power regulator, tail rotor state regulators, and so on. For fixed-wing aircraft, the aircraft control surfaces 504 can include engine power regulator, rudder servo, horizontal lifting surface servo, aileron servo, flap servo, and so on.

When the first control rod 110 of the control apparatus 100 returns to its center position, the corresponding manual-control signal can be a normal-state signal, or is absent. In this case, the automatic control system 500 may form a feedback closed loop 505, using the aircraft state measuring sensor 502 to measure state signals and feed them back to the aircraft controller 501, which controls the aircraft control surface 504, to realize in a first direction of movement a stably maintained flight state, such as altitude hold. If the first control rod 110 and the second control rod 120 of the control apparatus 100 in each direction of movement are restored to the center positions, the aircraft 104 can realize in each direction of movement a stably maintained flight state, such as hovering.

Figure 6:
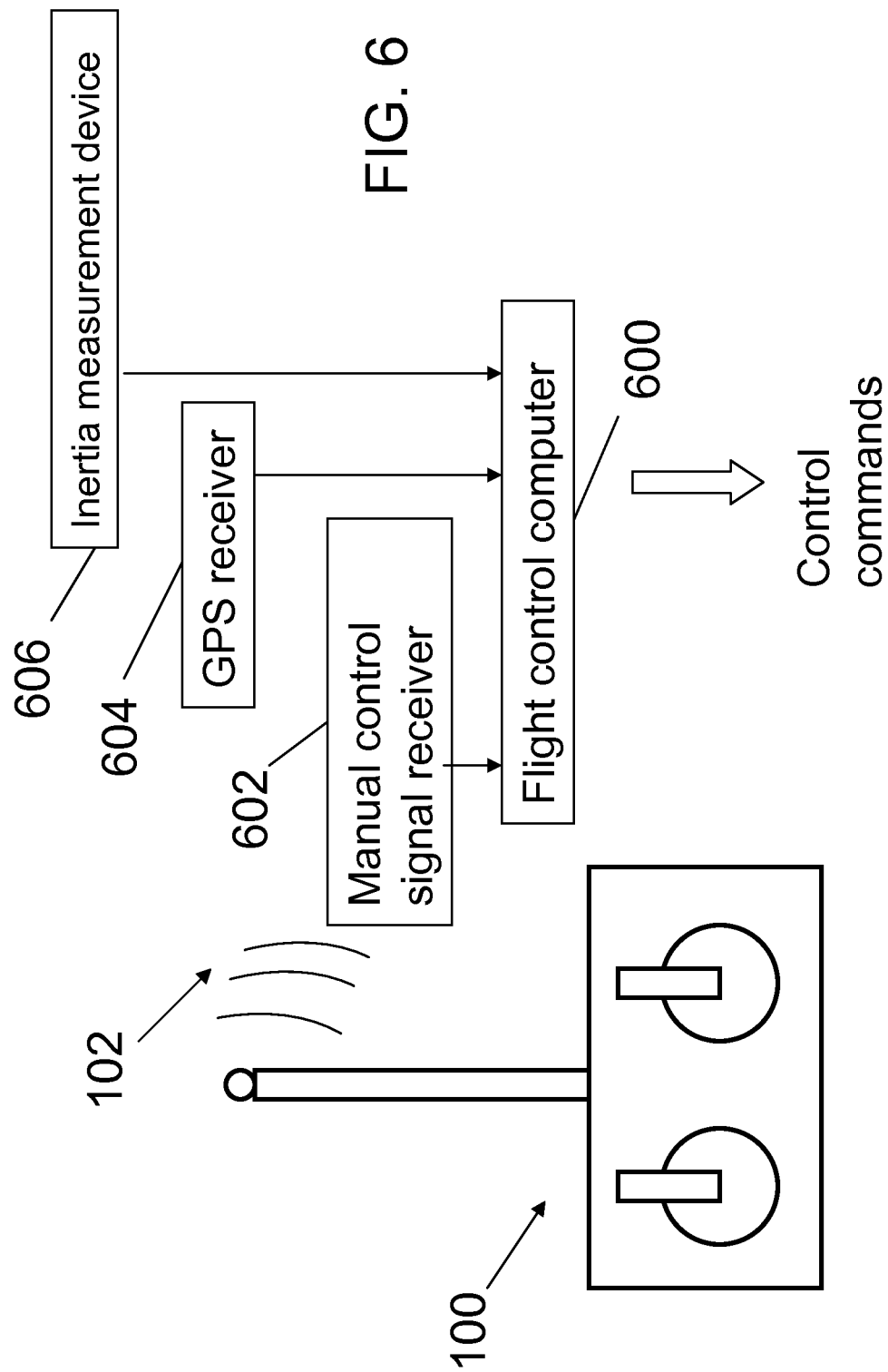
FIG. 6 is a block diagram illustrating the principles of the automatic control system signals of the aircraft.

FIG. 6 is a signal schematic diagram of an embodiment of an automatic control system to help realizing the above steady state maintaining (such as altitude hold, automatic hovering, etc.). Controller 500 implemented in the remotely-controlled aircraft 104 may be realized with a flight control computer 600, which can, through the manual control signal receiving device 602, receive a remote control signal 102 from the remote control apparatus 100, as well as GPS signals from the GPS reception apparatus 604, and inertia signals from the inertial measurement device 606. Flight control computer 600 can issue control instructions to control the aircraft flight based on the received signals.

The control instructions may include, for example, aircraft engine power control command, aircraft attitude control command, etc. For example, if the control signal receiving device 602 receives a signal that only includes the signal corresponding to the first control rod 110 is pushed upward to a certain magnitude, then the control command includes the control instructions for the engine power of the aircraft 104 so that the aircraft 104 climbs vertically in an approximately constant speed. Noting that in different environmental conditions (e.g., mean sea level altitude, temperature, wind speed, wind direction, etc.), the first control rod 110 being pushed upward of the same extent of movement may correspond to different engine powers.

According to an embodiment of the present disclosure, if the user removes the external force of the upward push applied to the first control rod 110, the first control rod 110 can automatically return to its preset position. Depending on the design, the first control rod 110 at the preset position of can correspond to not transmitting the related manual control signal, or a continuous emission of a constant manual control signal. In this case, the control command may include an altitude hold command based on GPS signals from the GPS receiver 604 and/or inertia signals from the inertial measurement unit 606. The altitude being held can be determined by: the first control rod 110 in the first movement direction being applied an external force (for example being pushed upwards) resulting a climb of the aircraft 104, when the upward pushing external force has a change (such as the user's letting go, and the first control rod 110 returning to its center position), the altitude arrived therein. That is, the state in which the aircraft enters and remains depends on the control signal generated from the external force change received by the first control rod 110 in its first direction of movement (which determines a previous-time flight status), and aircraft state signals measured by the state measurement sensors carried by the aircraft (which are used as the feedback signals to stabilize the aircraft flight state).

In FIG. 5 and FIG. 6, the aircraft control system includes both a remote control apparatus 104 and a controller 501 carried by the aircraft. The remote control apparatus 104 includes a first control rod, the movement of which in the first movement direction corresponds to control signals for controlling the motion of the aircraft in the first motion direction; return device, for returning the first control rod automatically to its preset position in the first direction in the case that the external force in the first movement direction is removed. Controller 501 may be used to control the state of the aircraft based on the control signal and the aircraft state signal state, wherein controller 501, in the case that the first control rod automatically returns to its preset position in the first direction, controls the aircraft to enter into a state hold.

Figure 7:
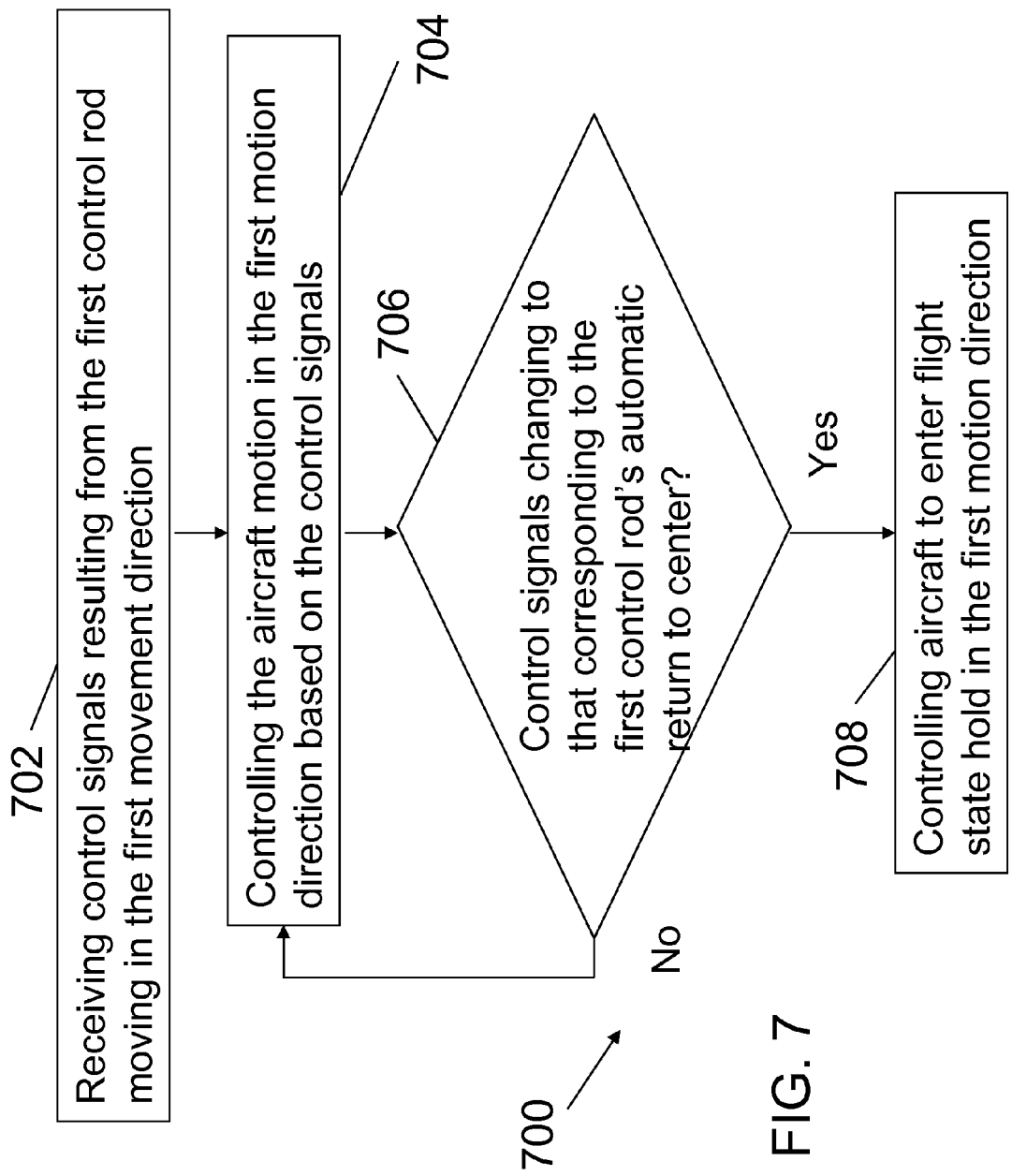
FIG. 7 is a flowchart of an aircraft control method.

FIG. 7 is a flowchart of a method of realizing the abovementioned control functions. The method 700 of FIG. 7 may include step 702 of receiving a control signal resulting from the first control rod moving in the first movement direction. In step 704, based on the control signal (e.g., signal 102 in FIG. 6), the flight control computer 600 issues the corresponding control commands, to control the aircraft motion in the first direction of motion, such as the aircraft climb/descent.

In the determining step 706, the flight control computer 600, based on the signal 102 received by the manual signal receiving device 602 from the remote control apparatus 100, determines whether the control signal changes to a control signal corresponding to the first control rod in a first direction of movement returning automatically to its preset position as a result of the removal of an external force applied to the first control rod in the first movement direction. For example, if the first control rod 110 has its external force in the first movement direction (e.g., the up/down direction 220) removed, then the corresponding control signal changes to the signal corresponding to the first control rod automatically returning to its position. In some embodiments, the signal corresponding to the first control rod returning automatically to its position is a steady-state signal. In other embodiments, the signal corresponding to the first control rod returning automatically to its position is a zero signal (i.e., a corresponding signal disappears).

If the external force is not removed then continue executing the control in step 704. If the external force is removed, the associated control signal changes to that corresponding to the first control rod automatically returning to its preset position in the first direction of movement due to changes in the external force (e.g., removal), then in step 708 the aircraft is controlled, in the first direction of motion (such as vertical climb/descend direction), to enter into a flight state hold, such as altitude hold. The holding state corresponds to the first control rod 110 in the first movement direction (e.g., the up/down direction 220) automatically returning to the preset position (for example, the center position of the first control rod in the first movement direction). Note here that a same preset control rod position may correspond to different states of the holding (such as altitudes).

In some embodiments, the aircraft 104 has a main function of carrying a camera 109 to achieve the imaging of targets on the ground. Aircraft up/down can be achieved with pulling away from/closing in toward the target, to obtain a long view or short range imaging. The extent of movement of pulling away/closing in can be determined by the distance between the aircraft and the target. The rate of the pulling away/closing in can be controlled with the speed of the aircraft.

Camera 109 can also have lens focal length zooming out/zooming in functions, and its extent of movement and rate of zooming out/zooming in can also be controlled. In some embodiments, the aircraft climb/descend in step 704 can be coupled with the camera focal length zooming out/zooming in. The first control rod 110 can have its movement in the first movement direction 220 control the aircraft climb/descend motion, the camera focal length zoom out/zoom in, or the coupled motion of the aircraft climb/descend and the camera focal length zoom out/zoom in. For example, aircraft 04 can determine its distance from obstacles, targets, or the ground. When the distance is too close could affect flight safety, the aircraft no longer climbs/descends, and the movement of control rod 110 in the up/down direction 220 becomes controlling the camera focal length to zoom out/zoom in. This control function switching can also be controlled manually by the user. In some embodiments, the flight control computer 600 can automatically realize the coupling motion and its decoupling between the aircraft up/down and the camera focal length zooming out/zooming in, to thereby achieve optimal imaging purposes.

As such, after the control rod 110 in the up/down movement direction automatically returns to center, the coupling of the aircraft altitude and the camera focal length maintains a previous position. In a specific example, aircraft 104 is controlled to track and shoot video of a cyclist, which will climb and descend with the terrain. When the cyclist descends to a lower-lying area, the automatic center position of control rod 110 in the up/down direction can correspond to a constant image size, and the aircraft can, in the case that control rod 110 in the up/down direction has no operator actions, automatically descend to maintain a distance to the target to thereby make the image captured have an invariable size. However, if the aircraft descends too much there may be safety issues, such as the distance to obstructions (e.g., tree branches) becomes too close, then the same control rod 110 returning to its center position may correspond to the focal length of the camera zooming in. In this embodiment, the control rod 110 in the up/down direction returning to its center position does not necessarily correspond to the aircraft's maintaining the previous altitude, but corresponds to the coupled value of the aircraft's altitude and the camera focal length maintaining the previous value. Image size can be used as a feedback parameter to keep the aircraft/camera focal length coupling in a steady state.

Figure 8:
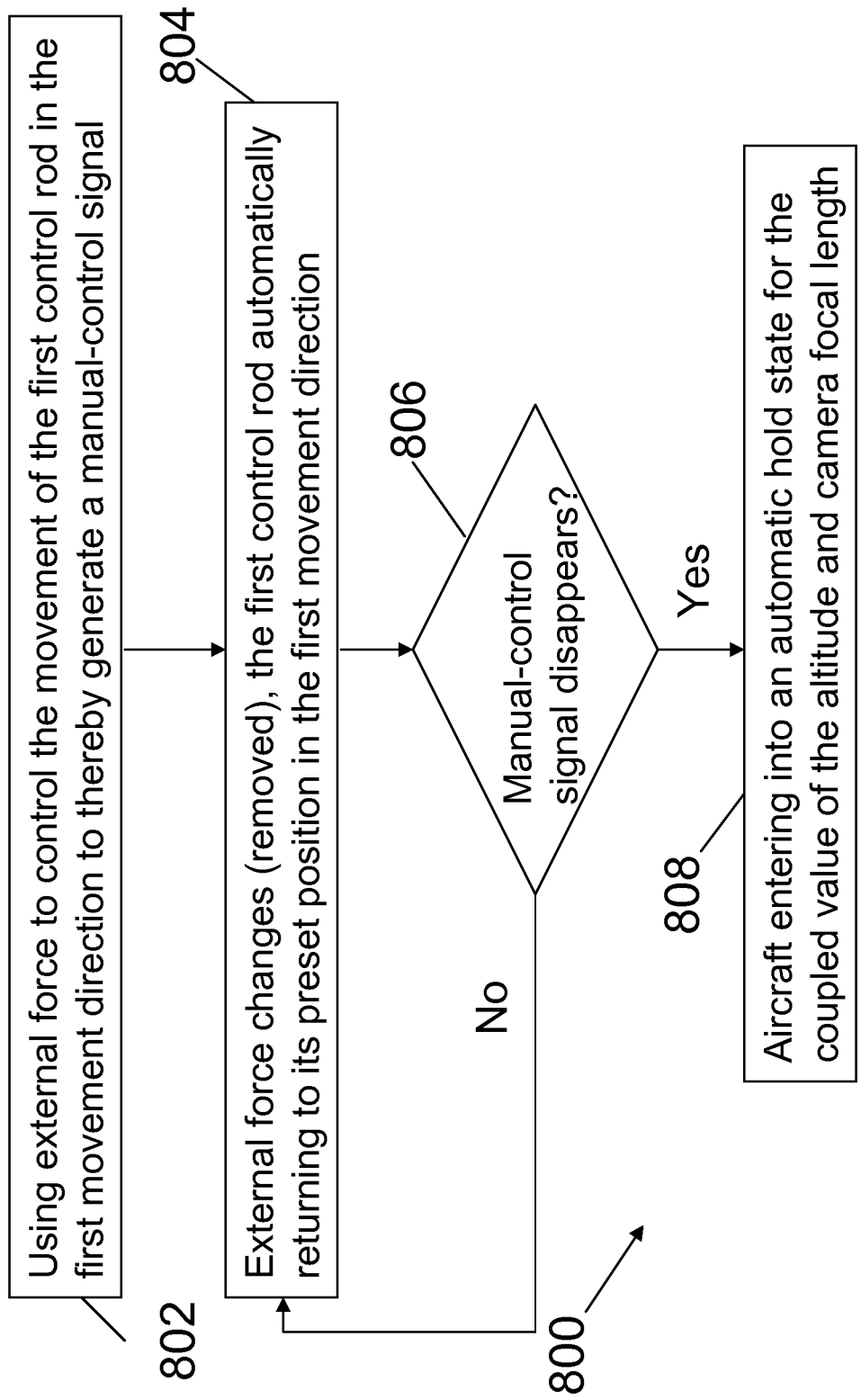
FIG. 8 is a flowchart of an embodiment of a method to realize automatic control functions of the aircraft.

FIG. 8 shows a specific embodiment of the method 800 to achieve the above object of imaging. In step 802, use the external force to control the first control rod 110 to move in the first direction of movement 220 thereby generating a hand-control signal. Accordingly, the aircraft 104 moves in the first direction of motion (such as vertical climb/descend). In some embodiments, the control signals resulting from the first control rod 110 moving in the first movement direction 220 is used to control the aircraft up/down or the camera focal length zooming out/zooming in, or the coupling of the two.

In step 804, the force changes (e.g., removal), the first control rod 110 automatically returns to its preset position in the first movement direction (e.g., returning to center in the up-down direction). In the determining step 806, the flight control computer 600 determines whether the manual-control signal 102 received by the hand control signal receiving device 602 from the remote control device is the control signal generated by the change in the external force applied to the first control rod 110 (e.g., the external force is removed resulting in the first control rod 110 automatically returning to its center position, which led to the manual-control signal 102 disappearing or becoming a stable signal). In some embodiments, if it is, then it indicates that the external force applied to the control rod 110 in the up-down movement direction 220 is removed. Therefore, this determining steps is equivalent to determining whether the external force applied to the first control rod in the first direction of movement is removed thereby causing the first control rod to automatically return to its preset position in the first direction of movement.

If the external force is not removed, then continue to execute the control in step. If it has been removed, then in step 808 the aircraft enters an altitude hold state based on GPS and/or inertial measurement signal and the altitude reached in the previous step, or enters an aircraft altitude/camera focal length coupled value hold state based the image feedback. That is, if the aircraft receives control signals for heading, left-right and forward-backward translational motions, then the aircraft continues with these motions, but the flying altitude (or the coupled value of the aircraft altitude and camera focal length) remains unchanged. Here the "flight state" can be defined as the coupled value of the aircraft altitude and the camera focal length.

The determining step above may also include determining whether the first and second control rods both automatically return to their respective preset positions as a result of the external forces in all directions are removed; if yes, then control the aircraft to enter into a hovering state. For example, if the first control rod 110 and the second control rod 112 both automatically return to their center positions, then the aircraft enters an automatic airborne hovering state based on GPS and/or inertial measurement signals and the state achieved in the previous step, in other words, the altitude, heading, and horizontal positions are kept substantially constant. Therefore, the control method above may further include measuring the aircraft 104 state signals, obtaining, based on GPS and/or inertial measurements, altitude and position signals. Using the measured aircraft state signals to feed back to the aircraft 104 to control the aircraft to execute said state hold.

Figure 9:
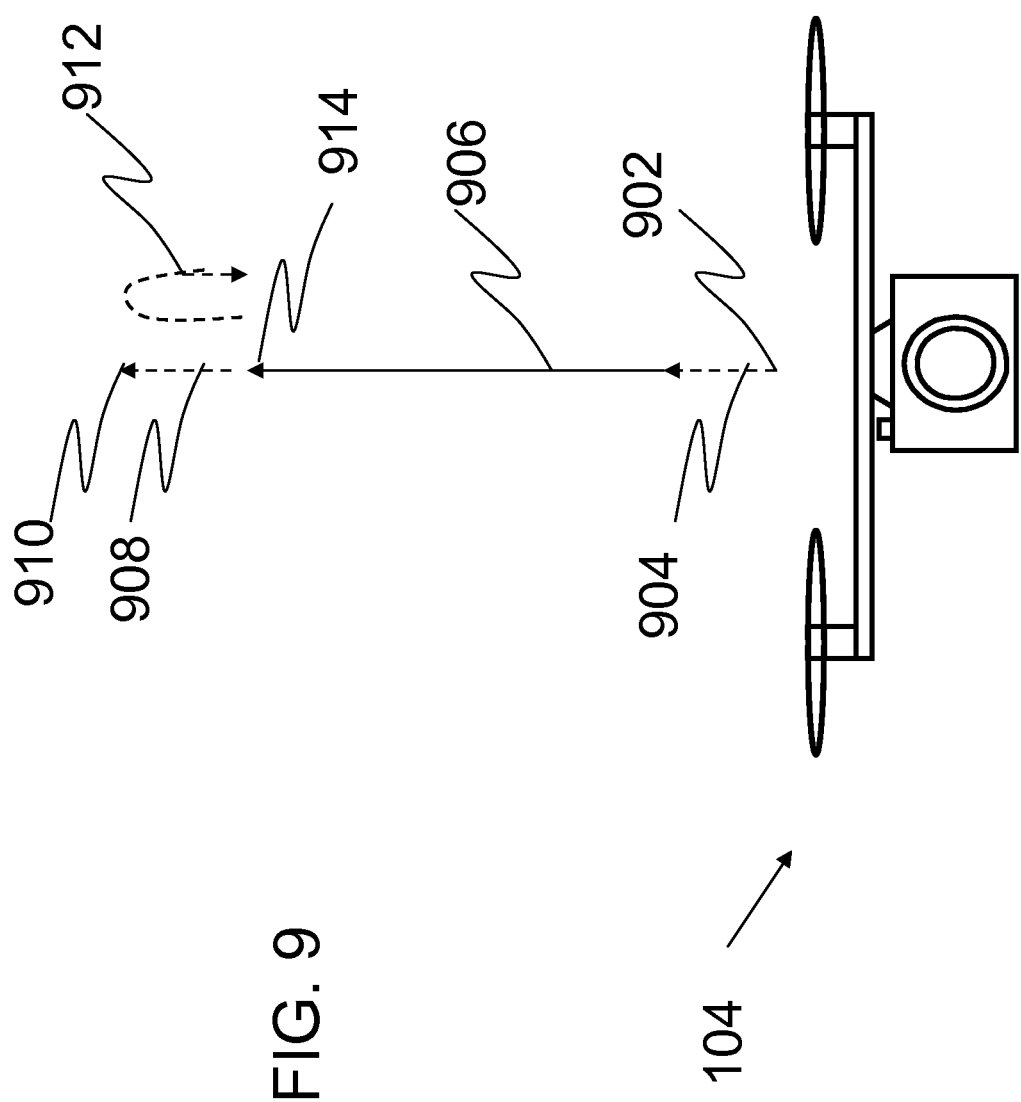
FIG. 9 is an illustration of the aircraft of FIG. 1 vertical climbing as controlled.

FIG. 9 is a schematic view of the aircraft in a controlled vertical climb. In this example, the second control rod 112 is in its automatically-return-to-center position, and thus the horizontal position of the aircraft 104 remains unchanged. The aircraft 104 receives a hand-control control signal corresponding to using an external force to control the first control rod 110 to move in a first direction of movement 220, aircraft 104 enters an accelerated climb phase 904 from its original altitude 902.

The climb speed of the aircraft 104, after reaching a rate value corresponding to the extent of movement of the first control rod 110 in the first direction of movement 220, the vehicle 104 may enter a steady-state climb stage 906. As mentioned previously, aircraft 104 in the steady-state climb stage 906 has a climb speed approximately in linear proportional to the extent of movement of the first control rod 110 in the first movement direction 220.

When the first control rod 110 in the first direction of movement 220 has its external force removed, the aircraft 104 moving in the first motion direction enters into a deceleration state, such as a decelerated climb phase 908. If the first control rod maintains its preset position (automatic return to center) in the first movement direction, then the aircraft, after its speed in the first direction of movement is decelerated to zero, will be maintaining this state. In some embodiments, when the climb speed of the aircraft 104 is reduced to zero, the aircraft 104 enters an altitude hold state, maintaining the altitude 910. The lengths of the accelerated climb phase 904 and the decelerated climb phase 908 depend on the engine power, the mass (inertia) of the aircraft 104, and so on.

In some embodiments, the process of the external force changing in the first movement direction of the first control rod (e.g. removal) and its automatically returning to the pre-set position correspond to the process of the aircraft decelerating from the start of deceleration to zero speed in the first motion direction. For example, the decelerated climb stage 908 happens to correspond to the time interval of the first control rod from the removal of the force until it returns completely to the preset position.

In some other embodiments, the aircraft 104 automatically descends for a segment 912 after the external force over the first control rod 110 is removed, and returns to the altitude 914 of the time when the external force over the first control rod 110 is removed. In yet some other embodiments, the aircraft 104 can have a specific altitude as controlled by the user input. Some embodiments of the present disclosure provide the users with the freedom to programmatically-control the aircraft flight profile.

All references cited in the description are hereby incorporated by reference in their entirety. While the disclosure has been described with respect to a limited number of embodiments, those skilled in the art, having benefit of this disclosure, will appreciate that other embodiments can be advised and achieved which do not depart from the scope of the description as disclosed herein.

The invention claimed is:

1. An aircraft control system, comprising:
a remote control apparatus with a first control rod, wherein the first control rod is configured to move in a first movement direction to control a motion of an aircraft in a first motion direction when an external force is applied on the first control rod in the first movement direction,
wherein the remote control apparatus operates to generate one or more control signals, when the first control rod automatically returns to the preset position along the first movement direction after a withdrawal of the external force applied to the first control rod in the first movement direction; and
a fight controller associated with the aircraft, wherein the fight controller operates to control a coupling of a motion of the aircraft and a zooming of a camera carried by the aircraft to maintain a size of an image of a target after receiving said one or more control signals indicating that the first control rod automatically returns to the preset position along the first movement direction.

2. The control system of claim 1, wherein the fight controller operates to control the aircraft to avoid an obstacle while adjusting the zooming of the camera carried by the aircraft to maintain the size of the image of the target after receiving said one or more control signals indicating that the first control rod automatically returns to the preset position along the first movement direction.

3. The control system of claim 1, wherein the remote control apparatus further comprises a second control rod configured to control at least one of a translational flight and an orientation of the aircraft, wherein the second control rod automatically returns to a preset position after an external force on the second control rod is withdrawn.

4. The control system of claim 1, wherein the preset position for the first control rod is a center position along the first movement direction.

5. The control system of claim 4, wherein the remote control apparatus further comprises a spring apparatus that is configured to drive the first control rod to automatically return to the center position after the external force is withdrawn.

6. The control system of claim 1, wherein the first motion direction is an up and down motion direction of the aircraft.

7. The control system of claim 6, wherein a movement of the first control rod in a second movement direction controls an orientation of the aircraft, and wherein the first control rod returns to a center position along the second movement direction after an external force applied on the first control rod in the second movement direction is withdrawn.

8. The control system of claim 1, wherein an extent of movement of the first control rod in the first movement direction corresponds proportionally to a motion velocity of the aircraft in the first motion direction.

9. The control system of claim 1, wherein a movement of the first control rod in a first movement direction controls the coupling of a motion of the aircraft and the zooming of the camera carried by the aircraft.

10. An aircraft control method, comprising:
controlling, via a fight controller associated with an aircraft, the aircraft to move in a first motion direction, when an external force is applied on a first control rod of a remote control apparatus in a first movement direction;
receiving one or more control signals from the remote control apparatus indicating a return of the first control rod to a preset position along the first movement direction after a withdrawal of the external force applied on the first control rod in the first movement direction;
controlling, via the fight controller, a coupling of a motion of the aircraft and a zooming of a camera carried by the aircraft to maintain a size of an image of a target after receiving said one or more control signals.

11. The control method of claim 10, further comprising:
controlling the aircraft to avoid an obstacle while adjusting the zooming of the camera carried by the aircraft to maintain the size of the image of the target after receiving said one or more control signals.

12. The control method of claim 10, wherein the first motion direction is an up and down motion direction of the aircraft.

\* \* \* \* \*